United States Patent
Ueda et al.

[11] Patent Number: 5,819,700
[45] Date of Patent: Oct. 13, 1998

[54] COMBUSTION CHAMBER STRUCTURE FOR AN INTERNAL COMBUSTION ENGINE

[75] Inventors: Takanori Ueda; Takeshi Okumura, both of Susono; Shizuo Sasaki, Numazu, all of Japan

[73] Assignee: Toyota Jidosha Kabushiki Kaisha, Toyota, Japan

[21] Appl. No.: 987,235

[22] Filed: Dec. 9, 1997

[30] Foreign Application Priority Data

Dec. 24, 1996 [JP] Japan ................... 8-343908

[51] Int. Cl.$^6$ ........................................... F02F 3/24
[52] U.S. Cl. ................... 123/262; 123/279; 123/307; 123/661
[58] Field of Search .................. 123/661, 262, 123/276, 279, 307, 308

[56] References Cited

U.S. PATENT DOCUMENTS

| | | | |
|---|---|---|---|
| 4,162,661 | 7/1979 | Nakanishi et al. | 123/307 |
| 4,259,933 | 4/1981 | Nakanishi et al. | 123/307 |
| 4,763,622 | 8/1988 | Indra et al. | 123/661 |

FOREIGN PATENT DOCUMENTS

| | | |
|---|---|---|
| U-60-102428 | 7/1985 | Japan . |
| A-1-182524 | 7/1989 | Japan . |

*Primary Examiner*—Erick R. Solis
*Attorney, Agent, or Firm*—Oliff & Berridge, PLC

[57] ABSTRACT

To accelerate a combustion within an entire combustion chamber including the vicinity of an opening portion for air suction to thereby make uniform a flame propagation in a combustion chamber structure for an internal combustion engine, and to provide a technology for preventing the generation of knocks, a longitudinal sectional shape of a top wall surface of the combustion chamber is in the form of a substantially triangular shape in longitudinal section defined and surrounded by a cylinder head, a cylinder and a piston. A projection is provided on a circumferential edge portion of a top surface of the piston, with a surface, facing the top wall surface of the combustion chamber, of the projection being substantially in parallel with the top wall surface of the combustion chamber. A cutaway portion is formed in the vicinity of at least a portion, facing the intake opening portion, of the projection of the top surface of the piston.

6 Claims, 9 Drawing Sheets

COMBUSTION CHAMBER STRUCTURE FOR AN INTERNAL COMBUSTION ENGINE

BACKGROUND OF THE INVENTION

The present invention relates to a combustion chamber of an internal combustion engine.

A combustion chamber structure of an internal combustion engine is known to improve a combustion rate of mixture in the internal combustion engine as shown in, for example, Japanese Utility Model Application Laid-Open No. SHO 60-102428.

The combustion chamber structure of the internal combustion engine is as follows. A circumferential edge portion of a top of a piston and a circumferential edge portion of an inner wall of a cylinder head are projected with each other so that, when the piston is located in the vicinity of the top dead center, the circumferential edge portion of the top of the piston and the circumferential edge portion of the inner wall of the cylinder head are close to each other to form a squish area for generating a so-called squish flow.

Then, in the combustion chamber, a spark plug is disposed in the inner wall surface of the cylinder head more on the exhaust valve side than the position where the squish flow collides, directed to the center of the combustion chamber from the squish area.

With such a structure of the combustion chamber of the internal combustion chamber, in a final stage of a compression stroke, the circumferential edge portion of the inner wall surface of the cylinder head and the circumferential edge portion of the top of the piston are close to each other so that the squish area is narrowed. Accordingly, air or mixture located in the squish area is directed to the central portion of the combustion chamber in the form of the squish flow.

The squish flows directed to the central portion of the combustion chamber collide with each other to generate a turbulence. By this turbulence, the combustion of the central portion of the combustion chamber is accelerated.

Next, when the internal combustion takes an expansion stroke from the compression stroke and the piston starts to be lowered, the squish area is expanded, a phenomenon which is referred to as a reverse squish in which the mixture is sucked in the expanded squish area is generated. When the mixture is sucked into the squish area by the reverse squish, a flame generated by the spark plug also reaches the vicinity of the squish area from the central portion of the combustion chamber by the abovedescribed reverse squish. Then, when the squish area is expanded in accordance with the further lowering movement of the piston, the above-described flame is sucked into the squish area to thereby burn the mixture within the squish area.

The above-described combustion chamber structure of the internal combustion engine is thus used for accelerating the combustion of the portion where the flame propagation is slow, thereby making uniform the flame propagation, i.e., for reducing the difference in the combustion completion timing at each circumferential portion.

By the way, an intake opening portion for introducing new air and mixture into the combustion chamber and an intake valve for opening/closing the intake opening portion are provided in the cylinder head. Thus, since a temperature of the vicinity of the intake opening portion is lowered by the introduction of the cold new air and mixture, it is necessary to accelerate the combustion in this portion.

However, since it is necessary to provide a clearance to some extent in order to avoid the contact between the intake valves and the piston top surface, in between the vicinity of the intake opening portion and the piston top surface, it is impossible to form the squish area of the suitable clearance and it is difficult to accelerate the combustion in the vicinity of the intake opening portion. As a result, there is a fear that the mixture residing in the vicinity of the intake opening portion is self-ignited before the flame generated by the ignition of the spark plug has reached the place, resulting in a knock of the combustion.

SUMMARY OF THE INVENTION

In view of the above-described defects, the present invention has been made, and therefore has an object of the present invention to provide a technology to prevent generation of a knock of combustion while making the flame propagation uniform by accelerating the combustion in the portion where the flame propagation is slow as in the vicinity of the intake opening portion.

In order to solve the above-noted defects, the following means is adopted according to the present invention.

A combustion chamber structure for an internal combustion engine according to the present invention, a longitudinal sectional shape of a top wall surface of a combustion chamber is in the form of a substantially triangular shape in longitudinal section in one direction passing through a center of the combustion chamber defined and surrounded by a cylinder head, a cylinder and a piston, with a spark plug being disposed at an apex portion of the triangular shape and an intake opening portion and an exhaust opening portion on the top surface of the combustion chamber, and is characterized in that:

a projection is provided on a circumferential edge portion of a top surface of the piston, with a surface, facing the top wall surface of the combustion chamber, of the projection being substantially in parallel with the top wall surface of the combustion chamber; and a cutaway portion is formed in the vicinity of at least a portion, facing the intake opening portion, of the projection of the top surface of the piston.

In this combustion chamber structure of the internal combustion engine, when the internal combustion chamber takes a shift in latter half of the compression stroke, the piston is raised up to the vicinity of the top dead center, the projection of the top surface of the piston and the top wall surface of the combustion chamber are close to each other to form a squish area. Then, when the piston is further raised, the squish area is narrowed so that the air, the mixture and the like that are residual in the squish area are advanced toward the central portion of the combustion chamber in the form of squish flows.

In this case, since the surface, facing the top wall surface of the combustion chamber, of the projection of the top surface of the piston is formed substantially in parallel with the top wall surface of the combustion chamber, the squish flows are advanced substantially in parallel with the top wall surface of the combustion chamber to flow toward the apex portion of the combustion chamber, i.e., the vicinity of the spark plug. Then, the squish flows that have been advanced close to the spark plug are brought into collision with each other to form the turbulence in the vicinity of the spark plug so that the combustion in the vicinity of the spark plug is accelerated.

Also, the air and mixture located in the squish area in the vicinity of the cutaway portion is introduced into the cutaway portion and collide with each other to generate the turbulence.

Then, when the internal combustion engine takes a shift from the compression stroke to the expansion stroke, and the piston starts to be lowered, the squish area is expanded so that the reverse squish flows are generated toward the squish area from the central portion of the combustion chamber. The reverse squish flows are advanced substantially in parallel with the top wall surface of the combustion chamber.

According to the present invention, since the surface, facing the top wall surface of the combustion chamber, of the projection of the top surface of the piston is formed substantially in parallel with the top wall surface of the combustion chamber, the reverse squish flows are strongly sucked into the squish area.

The reverse squish flows that have been sucked in the squish area reach the cylinder wall surface within the squish area and change their directions at the reached cylinder wall surface to advance in the circumferential direction along the wall surface of the cylinder.

The reverse squish flows that have changed the directions in the squish area around the cutaway portion are introduced into the cutaway portions and collided with each other to generate the turbulence. The turbulence becomes strong together with the turbulence generated in the previous compression stroke to accelerate the mixture residing around the cutaway portion, i.e., the mixture residing in the vicinity of the intake opening portion to thereby make uniform the flame propagation in the combustion chamber.

Accordingly, the mixture located in the vicinity of the intake opening portion where it is said that the flame propagation is slowest is burnt before the self-ignition to thereby suppress the generation of knocks.

Incidentally, the cutaway portion according to the present invention, formed in the vicinity of the portion facing the intake opening portion, may serve also as a valve recess in the projection of the top surface of the piston for avoiding any contact between the intake valve for opening/closing the intake opening portion and the piston.

Subsequently, in the case where the internal combustion engine is provided with a swirl flow generating means for generating swirl flows within the combustion chamber, the cutaway portion may be constructed by a groove formed in a direction in which the swirl flows generated by the swirl flow generating means are received so that the swirl flows are introduced into the cutaway portion, or the cutaway portion may be constructed by a groove formed in a direction in which the swirl flows generated by the swirl flow generating means are not received so that the swirl flows are not introduced into the cutaway portion.

Also, in the case where the internal combustion engine is provided with a tumble flow generating means for generating vertical eddy flows (tumble flows) within the combustion chamber, the cutaway portion may be constructed by a groove formed in a direction in which the tumble flows generated by the tumble flow generating means are received so that the tumble flows are introduced into the cutaway portion, or the cutaway portion may be constructed by a groove formed in a direction in which the tumble flows generated by the tumble flow generating means are not received so that the tumble flows are not introduced into the cutaway portion.

DETAILED DESCRIPTION OF THE PREFERRED EMBODIMENTS

The structure of a combustion chamber of an internal combustion engine according to the present invention will now be described with reference to the accompanying drawings.

Embodiment 1.

Figure 1:
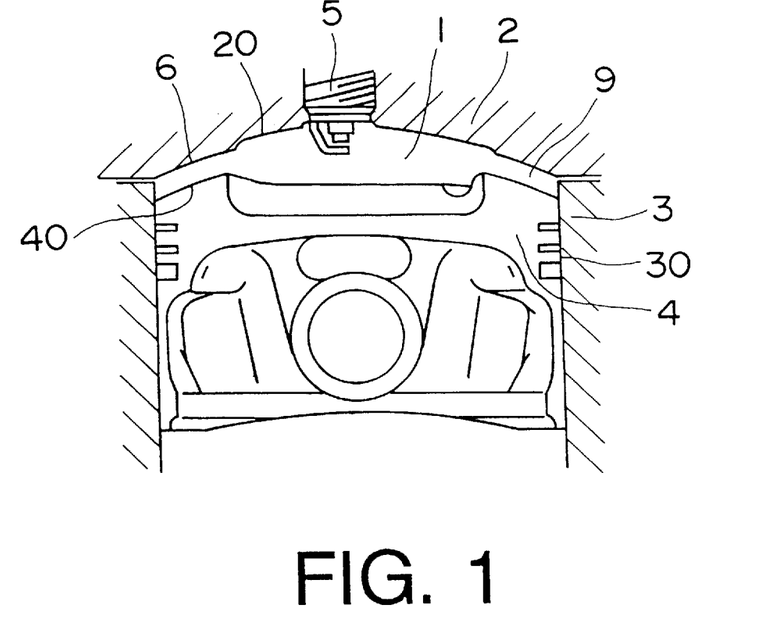
FIG. 1 is a cross-sectional view showing a combustion chamber structure in accordance with a first embodiment of the invention.

FIG. 1 is a view showing the structure of a combustion chamber of an internal combustion engine according to a first embodiment of the invention.

A combustion chamber 1 is defined by an inner wall surface 20 of a cylinder head 2, a wall surface 30 of a cylinder formed in a cylinder block 3, and a top surface of a piston 4 installed slidably within the cylinder.

Figure 2:
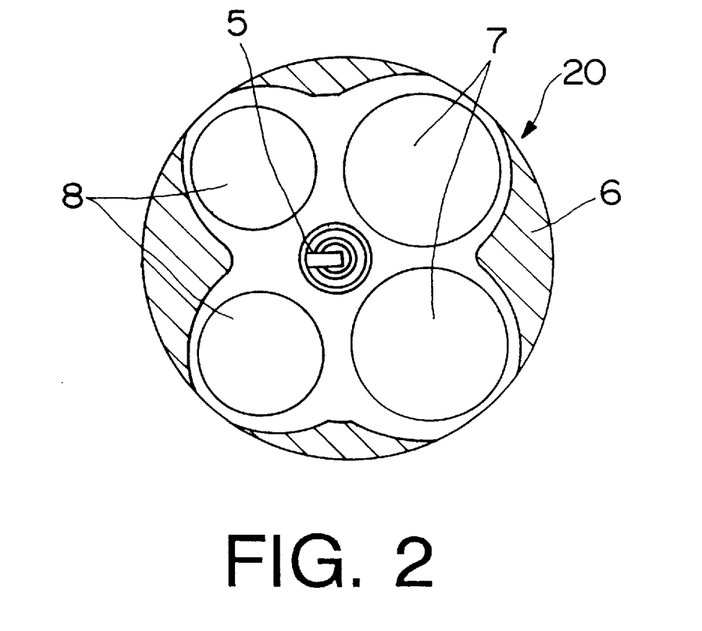
FIG. 2 is a plan view showing the structure of an inner wall surface of a cylinder head.

The inner wall surface 20 of the cylinder head 2 forms a top wall surface of the combustion chamber 1 and is shaped into a substantially triangle in longitudinal section in one direction, i.e., a so-called pent-roof. A spark plug 5 is disposed at an apex portion of the inner wall 20. As shown in FIG. 2, two opening portions 7 for air suction are provided on one side and two opening portions 8 for air exhaustion are provided on the other side around the spark plug 5. Projecting portions 6 are formed on a circumferential edge portion of the inner wall surface 20 except for the opening portions 7 and 8.

Turning back to FIG. 1, a projection 40 is formed also in the circumferential portion of the top surface of the piston 4. For this reason, a recess portion surrounded by the projection 40 is formed in the top surface of the piston 4. Then, a lower surface of the projecting portions 6 and a top surface of the projection 40 which are located to face each other are formed substantially in parallel with the inner wall surface 20 of the cylinder head 2. When the internal combustion engine takes the final stage of the compression stroke, the lower surface of the projecting portions 6 and the upper surface of the projection 40 are close to each other in accordance with the raising movement of the piston 4 to form the squish area 9 extending in a skew direction.

Figure 3:
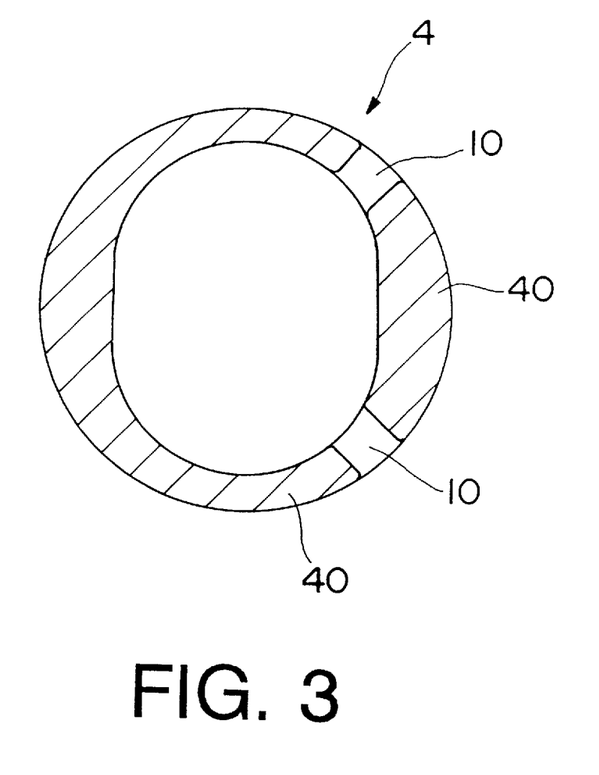
FIG. 3 is a plan view showing the structure of a piston.

Furthermore, as shown in FIG. 3, a plurality of cutaway portions 10 are formed in the projection 40 of the piston 4. The cutaway portions 10 are formed for generating a turbulence for entraining the air and the mixture of the squish areas 9, located on both adjacent sides of each cutaway portion 10, and colliding the entrained air and mixture when the piston is raised in the vicinity of the top dead center of the combustion. Then, a depth of the cutaway portions 10 is increased toward the inner circumferential side from the outer circumferential side of the piston 4 so that a stronger turbulence is generated on the inner circumferential side than the outer circumferential side. With respect to the positions of the above-described cutaway portions 10, the cutaway portions are provided at least portions facing the opening portion 7 for air suction where the flame propagation is slowest and a knock is liable to be generated.

The operation and effect of the combustion chamber structure of the internal combustion engine according to this embodiment will now be described.

Figure 4:
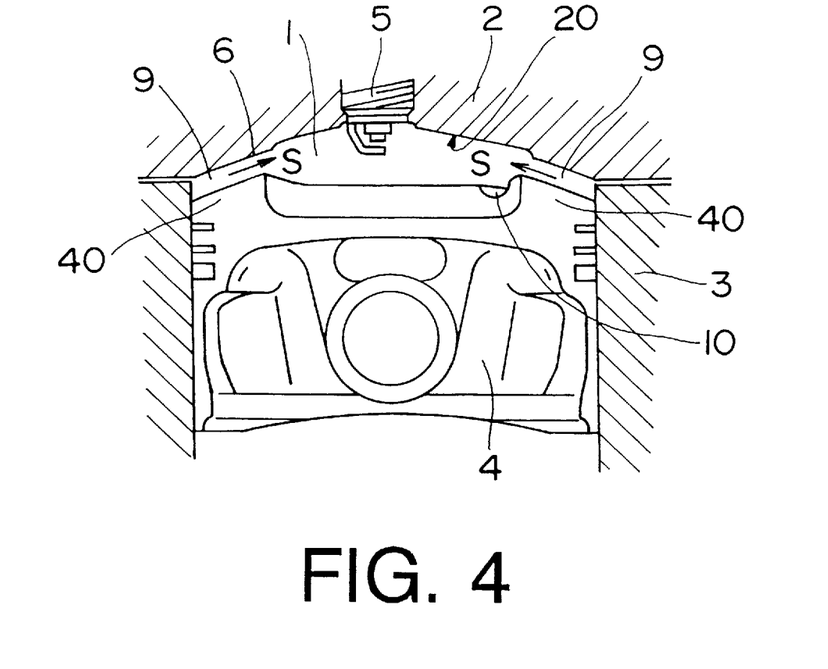
FIG. 4 is a view (1) illustrating a flow direction of squish flows.

First of all, when the piston 4 is raised to the vicinity of the top dead center in latter half of the compression stroke of the internal combustion engine, as shown in FIG. 4, the projecting portions 6 of the cylinder head 2 and the projection 40 of the piston 4 are close to each other to thereby form the squish areas 9. Then, when the piston 4 is further raised, the squish areas 9 are narrowed so that the squish flows S are generated in which the air and mixture within the squish area 9 are directed from the circumference of the internal combustion chamber 1 toward the vicinity of the spark plug 5.

The above-described squish flows S are advanced substantially in parallel with the inner wall surface 20 of the cylinder head 2 along the upper surface of the projection 40 and the lower surface of the projecting portions 6. Accordingly, the squish flows S are caused to flow toward the spark plug 5 without any attenuation caused by the contact of the inner wall surface 20 of the cylinder head 2 or the like.

The squish flows S that flow from the circumference of the combustion chamber 1 to the vicinity of the spark plug 5 are collided with each other in the vicinity of the spark plug 5 to generate the turbulence.

Figure 5:
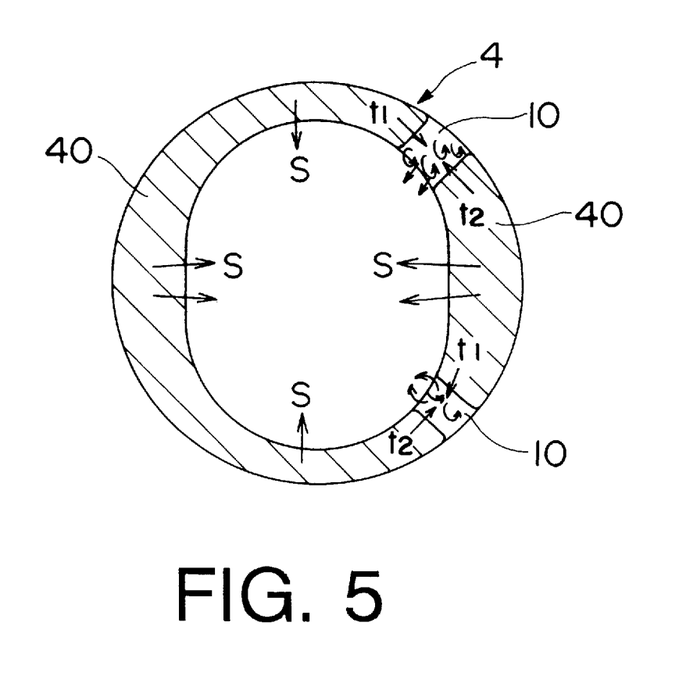
FIG. 5 is a view (2) illustrating a flow direction of the squish flows.

Also, out of the air and the mixture located in the squish areas 9, the air and mixture located in the squish area 9 in the vicinity of the cutaway portions 10 of the above-described piston 4 are caused to flow into the cutaway portions 10 in accordance with the elevating movement of the piston 4. For example, as shown in FIG. 5, the air and mixture of the squish areas 9, located on both adjacent sides of each cutaway portion 10 are caused to flow into the cutaway portion 10 while becoming a flow t1 from one squish area 9 and a flow t2 from the other squish area. These flows t1 and t2 are collided with each other in the cutaway portion 10 to generate the turbulence.

Subsequently, when the spark plug 5 is ignited, the combustion in the vicinity of the spark plug 5 is accelerated by the turbulence generated by the collision of the above-described squish flows S.

Figure 6:
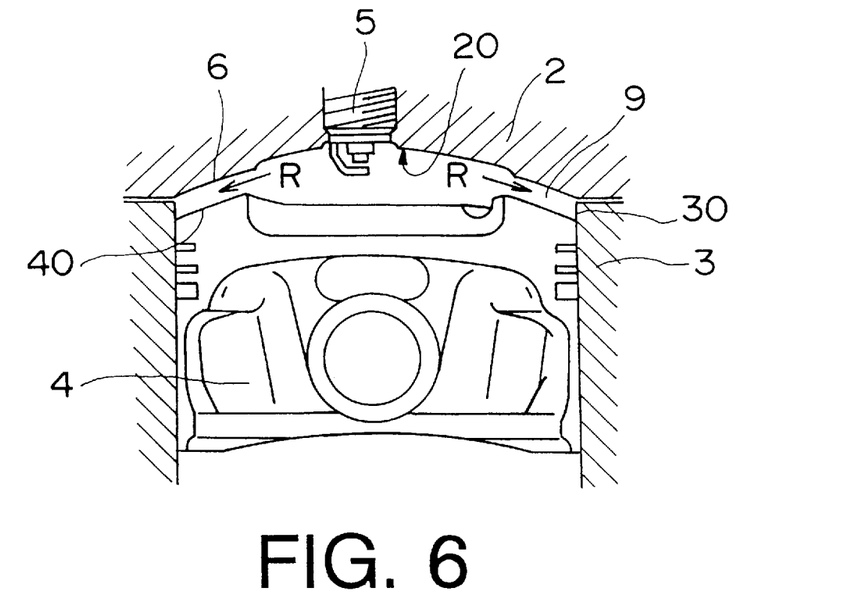
FIG. 6 is a view (1) illustrating a flow direction of reverse squish flows.

Then, when the internal combustion engine takes the sift from the combustion stroke to the expansion stroke so that the piston 4 starts to be lowered, the reverse squish in which the mixture is sucked into the squish areas 9, is generated. As shown in FIG. 6, by the reverse squish, the mixture forms a flow R that advances radially outwardly along the inner wall surface 20 of the cylinder head 2 from the central portion of the combustion chamber 1. At this time, the lower surface of the projecting portion 6 and the top surface of the projection 40 forming the squish areas 9 are formed substantially in parallel with the inner wall surface 20 of the cylinder head 2 and the step between the projecting portions 6 and the inner wall surface 20 of the cylinder head 2 is relatively small. Accordingly, the flows R would not be attenuated by the collision with the step and would be sucked into the squish areas 9 with a large power to reach the cylinder wall surface 30.

Thereafter, the flame produced by the ignition of the spark plug 5 is also advanced close to the squish area 9 by the flows R, and is sucked within the squish area 9 in accordance with the further downward movement of the piston 4 to well reach the wall surface 30 of the cylinder. Thus, the mixture that has been sucked within the squish area 9 is rapidly burnt.

Figure 7:
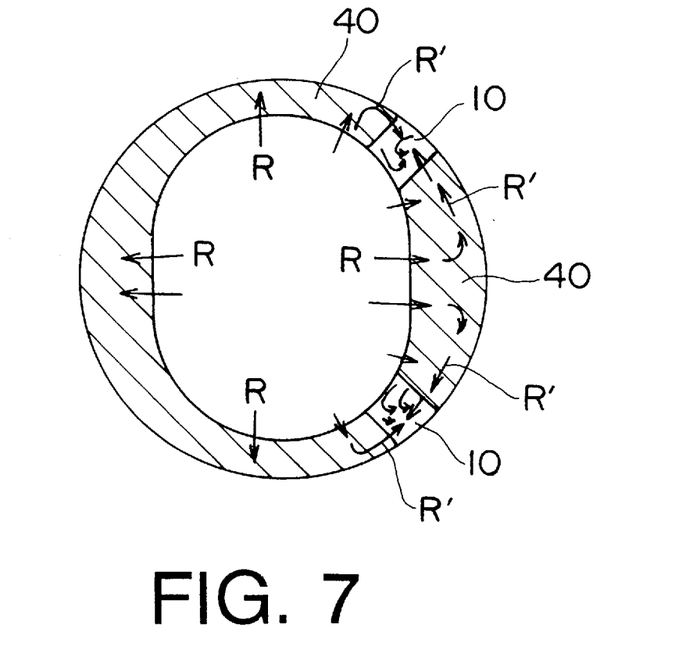
FIG. 7 is a view (2) illustrating a flow direction of the reverse squish flows.

Furthermore, as shown in FIG. 7, the flows R that have reached the wall surface 30 of the cylinder are brought into contact with the wall surface 30 of the cylinder to change their directions and to become flows R' which are directed in the circumferential direction along the wall surface 30 of the cylinder. At this time, the flows R' which have been formed in the squish area 9 in the vicinity of the above-described cutaway portions 10 are introduced into the cutaway portions 10. The flows R' are in collision with each other to form the turbulence. The turbulence becomes stronger together with the turbulence generated in the previous compression stroke to accelerate the combustion in the vicinity of the abovedescribed cutaway portions 10. As a result, the combustion in the vicinity of the intake opening portions 7 for air suction where it is said that the flame propagation is slowest is accelerated and effected before the mixture in the vicinity of the opening portions 7 for air suction is self-ignited.

Accordingly, in the combustion chamber structure of the internal combustion engine in accordance with this embodiment, the squish area 9 that is substantially in parallel with the inner circumferential wall surface 20 of the cylinder head is formed so that the flame strongly reaches the wall surface 30 of the cylinder to accelerate the combustion in the vicinity of the cylinder wall surface 30. Furthermore, the mixture and the flame that have strongly reached the cylinder wall surface 30 are introduced into the cutaway portions 10 to be in collision with each other within the cutaway portions 10 to generate the turbulence. It is therefore possible to accelerate the combustion in the vicinity of the opening portions 7 for air suction where it would be difficult to form a sufficient squish area. As a result, the flame propagation is made uniform within the combustion chamber 1 to prevent the generation of knocks.

Figure 8:
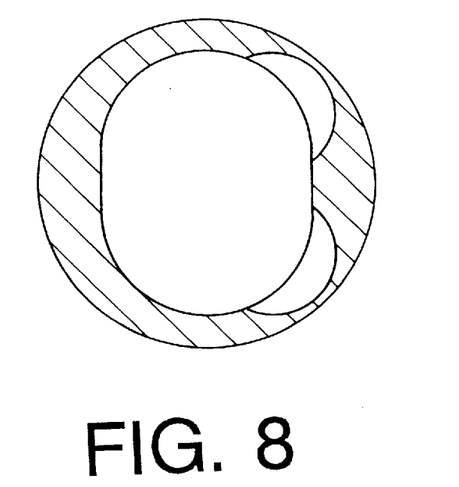
FIG. 8 is a view (1) showing another example of cutaway portions in accordance with the first embodiment.
Figure 9:
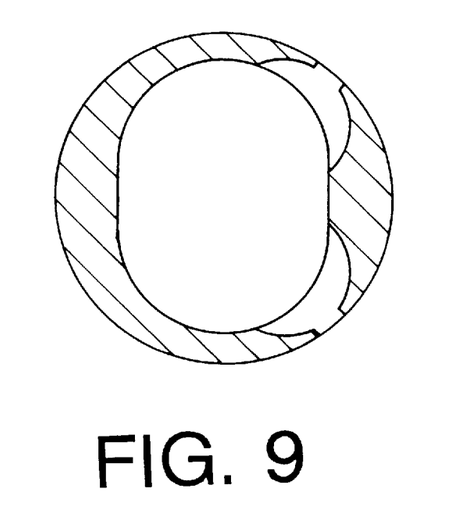
FIG. 9 is a view (2) showing the example of the cutaway portions in accordance with the first embodiment.

Incidentally, as shown in FIGS. 8 and 9, the cutaway portions may also serves as valve recesses for avoiding the collision between the piston 4 and the intake valves (not shown) for opening/closing the opening portions 7 for air suction.

Embodiment 2.

An example in which the combustion chamber structure of the internal combustion engine in accordance with the present invention is applied to a lean combustion type internal combustion engine will now be described with reference to FIGS. 10 to 12. In this case, the explanation therefor will be given only to the structure that is different from that of the foregoing first embodiment. The explanation of the like structure will be omitted.

Figure 10:
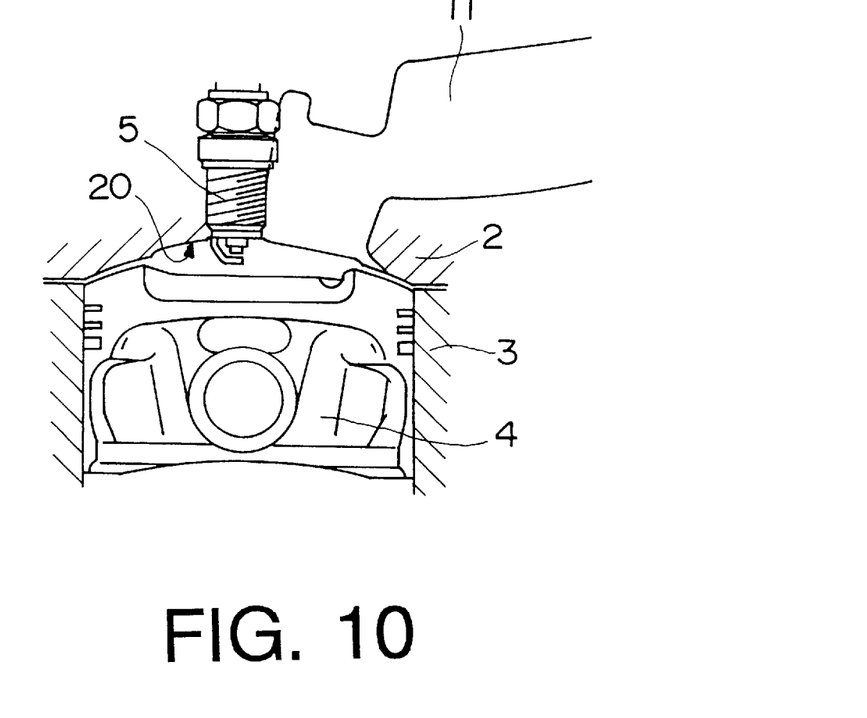
FIG. 10 is a cross-sectional view showing the structure of a combustion chamber in accordance with a second embodiment.
Figure 11:
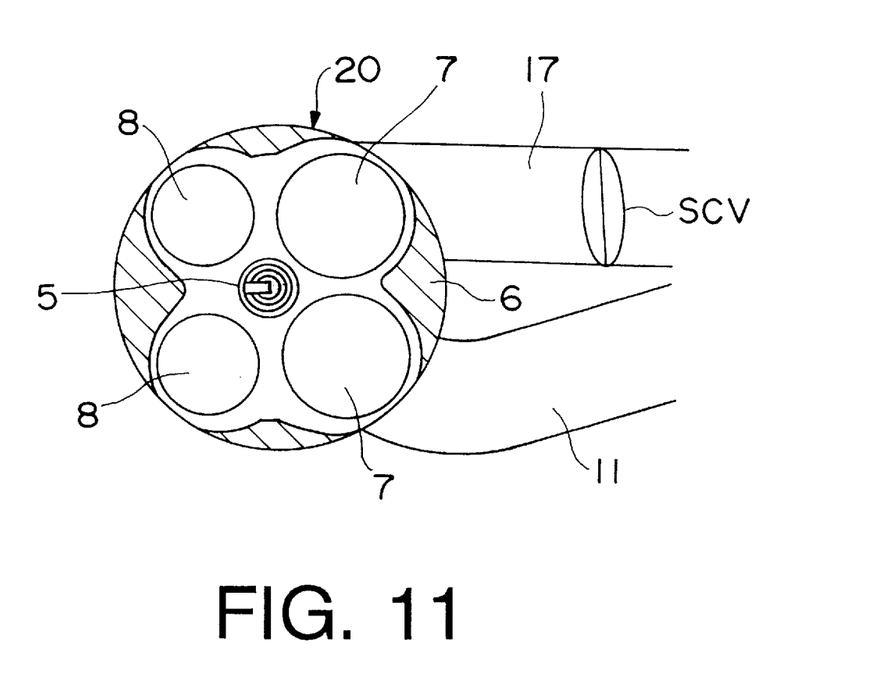
FIG. 11 is a plan view showing the structure of an inner wall surface of a cylinder head.

In FIGS. 10 and 11, a straight port 17 having a straight flow path is connected to one of two opening portions 7 for air suction formed in the cylinder head 2, whereas a swirl port 11 having a flow path in the tangential direction of the combustion chamber 1 is connected to the other opening portion 7 for air suction.

Then, a swirl control valve SCV for opening/closing the flow path of the straight port 17 is provided in the straight port 17. When the swirl control valve SCV is closed, the new air is introduced into the combustion chamber 1 only from the swirl port 11 so that the introduced new air forms the swirl flows SW.

Thus, the swirl port 11 and the swirl control valve SCV realizes the swirl generation means according to the present invention.

Figure 12:
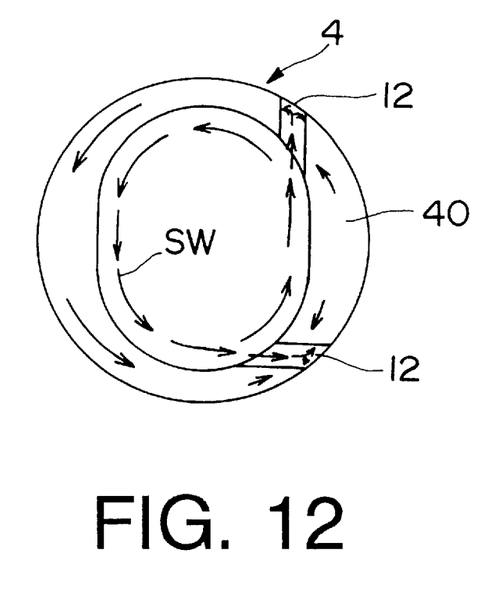
FIG. 12 is a plan view showing the structure of a piston.

Subsequently, as shown in FIG. 12, the cutaway portions 12 constructed by the grooves formed in the direction in which the swirl flows SW are received, are formed in a projection 40 formed in the circumferential edge portion of the top surface of the piston 4, so that a part of the swirl flows SW is introduced into the cutaway portions 12. The cutaway portions 12 are formed in the portion of the top surface of the piston 4 which faces the opening portions 7 for air suction in the same manner as in the first embodiment.

The other structure is the same as that of the first embodiment.

The operation and effect of this embodiment will now be described.

First of all, when in the compression stroke of the internal combustion engine, the swirl control valve SCV is closed and at the same time, the intake valves (not shown) open the opening portions 7 for air suction, the new air is introduced into the combustion chamber 1 only from the swirl port 11 to thereby form the swirl flows SW. Then, when the piston is raised to the top dead center in latter half of the compression stroke, a part of the swirl flows SW is introduced into the cutaway portions 12, and the air and mixture are introduced from the squish area 9 in the vicinity of the cutaway portions 12 so that these flows are in collision with each other to produce the turbulence.

Subsequently, when the internal combustion engine takes the shift from the compression stroke to the expansion stroke so that the piston 4 starts to be lowered, the reverse squish in which the mixture is sucked into the squish areas 9, is generated. By the reverse squish flows, the mixture is advanced from the central portion of the combustion chamber 1 radially outwardly along the inner circumferential wall surface 20 of the cylinder head 2, and is sucked strongly into the squish area 9. Then, the mixture that has been sucked into the squish are 9 strongly reaches the cylinder wall surface 30.

Thereafter, the flame produced by the ignition of the spark plug 5 is also advanced to the vicinity of the squish area 9 in the same manner as the mixture, and is strongly sucked into the squish area 9 in accordance with the downward movement of the piston 4 to strongly reach the wall surface 30 of the cylinder. Thus, the mixture that has been sucked into the squish area 9 is rapidly burnt.

Furthermore, the flows of the mixture and flame that have reached the wall surface 30 of the cylinder are brought into contact with the wall surface 30 of the cylinder to change their directions and to be directed in the circumferential direction along the wall surface 30 of the cylinder. Then, the flows of the mixture are introduced into the cutaway portions 12 to form the stronger turbulence together with the turbulence generated in the previous compression stroke. As a result, the combustion in the vicinity of the opening portions 7 for air suction where the flame propagation is slowest is accelerated and effected before the mixture in the vicinity of the opening portions 7 for air suction is self-ignited.

Figure 13:
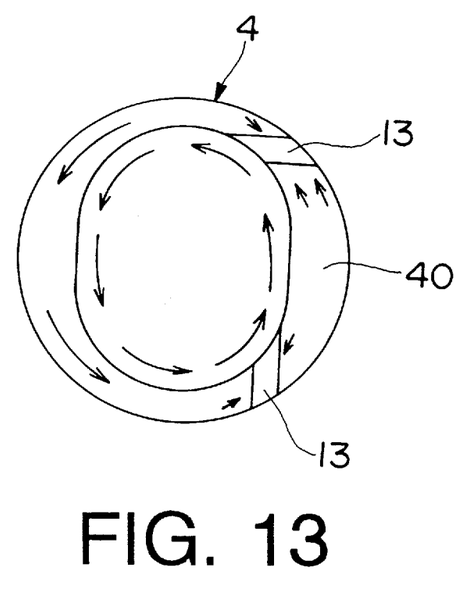
FIG. 13 is a view showing another example of cutaway portions in accordance with the second embodiment.

Incidentally, as shown in FIG. 13, it is possible to change the shape of the cutaway portions of the piston 4 to the grooves 13 formed in a direction where the swirl flows are not received. In this case, since the swirl flows are not introduced into the cutaway portions 13, it is possible to obtain the same advantage as that of the first embodiment without attenuating the swirl flows.

Embodiment 3.

An example in which the combustion chamber structure of the internal combustion engine in accordance with the present invention is applied to a lean combustion type internal combustion engine in which a vertical eddy flows (tumble flows) will now be described with reference to FIGS. 14 to 16. In this case, the explanation therefor will be given only to the structure that is different from that of the foregoing first embodiment. The explanation of the like structure will be omitted.

Figure 14:
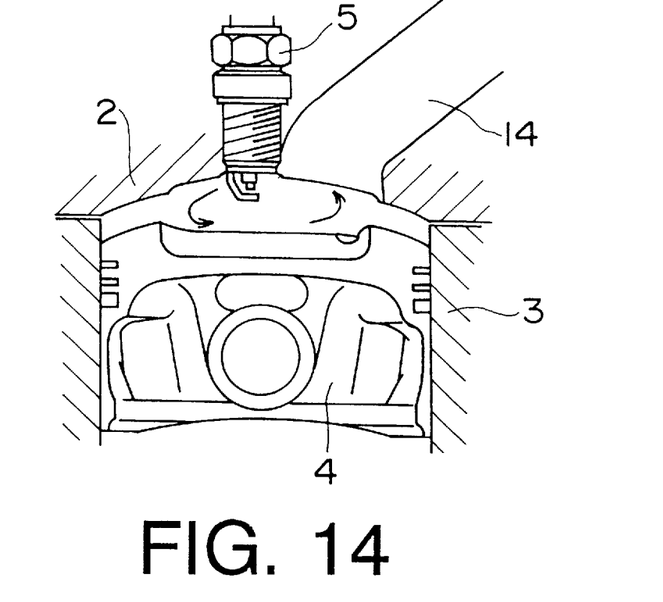
FIG. 14 is a cross-sectional view showing the structure of a combustion chamber in accordance with a third embodiment.

In FIG. 14, a tumble port 14 for producing vertical eddy flows within the combustion chamber 1 is connected to two opening portions 7 for air suction formed in the cylinder head 2 of the lean combustion type internal combustion engine.

Figure 15:
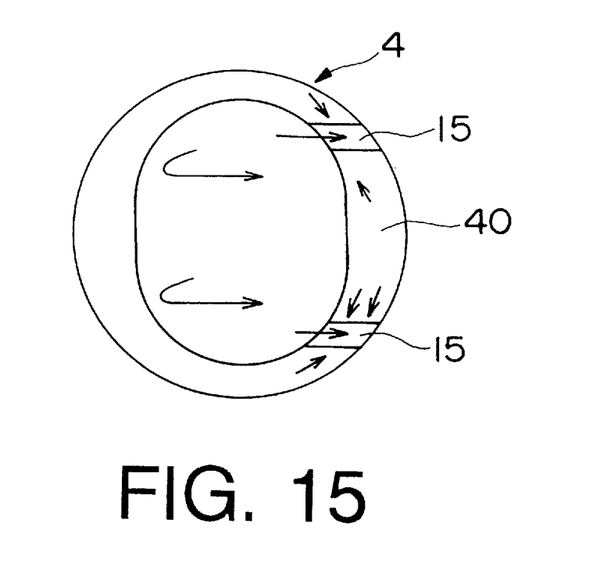
FIG. 15 is a plan view showing the structure of a piston.

Subsequently, as shown in FIG. 15, the cutaway portions 15 constructed by the grooves formed in a direction where the above-described tumble flows are received, are formed in a projection 40 formed on the circumferential edge portion of the top surface of the piston 4 so that a part of the tumble flows is introduced into the cutaway portions 15. The cutaway portions 15 are formed in the portion of the top surface of the piston 4 which faces the opening portions 7 for air suction in the same manner as in the first embodiment.

The other structure is the same as that of the first embodiment.

The operation and effect of this embodiment will now be described.

First of all, when in the compression stroke of the internal combustion engine, the intake valves (not shown) open the opening portions 7 for air suction, the new air is introduced into the combustion chamber 1 only from the tumble port 14 to thereby form the tumble flows. Then, when the piston is raised to the top dead center in latter half of the compression stroke, a part of the tumble flows is introduced into the cutaway portions 15, and the air and mixture are introduced from the squish area 9 in the vicinity of the cutaway portions 15 so that these flows are in collision with each other to produce the turbulence.

Subsequently, when the internal combustion engine takes the shift from the compression stroke to the combustion stroke so that the piston 4 starts to be lowered, the reverse squish in which the mixture is sucked into the squish areas 9, is generated. By the reverse squish flows, the mixture is advanced from the central portion of the combustion chamber 1 radially outwardly along the inner circumferential wall surface 20 of the cylinder head 2 and is sucked strongly into the squish area 9. Then, the mixture that has been sucked into the squish are 9 strongly reaches the cylinder wall surface 30.

Subsequently, the flame produced by the ignition of the spark plug 5 is also advanced to the vicinity of the squish area in the same manner as the mixture, and is strongly sucked into the squish area 9 in accordance with the downward movement of the piston 4 to strongly reach the wall surface 30 of the cylinder. Then, the mixture that has been sucked into the squish area 9 is rapidly burnt.

Furthermore, the flows of the mixture and flame that have reached the wall surface 30 of the cylinder are brought into contact with the wall surface 30 of the cylinder to change their directions and to be directed in the circumferential direction along the wall surface 30 of the cylinder. Then, the flows of the mixture are introduced into the cutaway portions 15 to form the stronger turbulence together with the turbulence generated in the previous compression stroke. As a result, the combustion in the vicinity of the opening portions 7 for air suction where it is said that the flame propagation is slowest is accelerated and effected before the mixture in the vicinity of the opening portions 7 for air suction is self-ignited.

Figure 16:
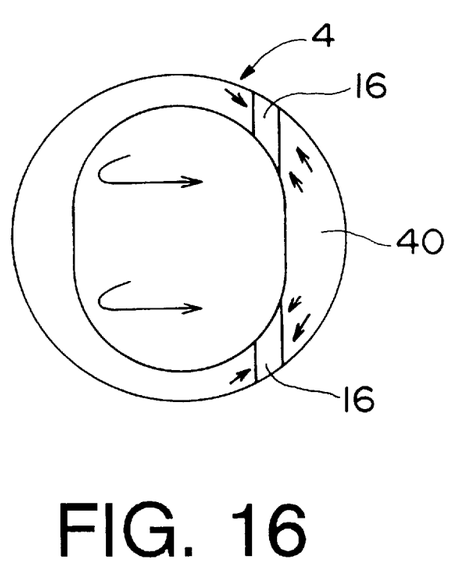
FIG. 16 is a view showing another example of cutaway portions in accordance with the third embodiment.

Incidentally, as shown in FIG. 16, it is possible to change the shape of the cutaway portions of the piston 4 to the grooves 16 formed in a direction where the tumble flows are not received. In this case, since the tumble flows are not introduced into the cutaway portions 16, it is possible to obtain the same advantage as that of the first embodiment without attenuating the tumble flows.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A combustion chamber structure for an internal combustion engine, in which a longitudinal sectional shape of a top wall surface of a combustion chamber is in the form of a substantially triangular shape in longitudinal section in one direction passing through a center of the combustion chamber defined and surrounded by a cylinder head, a cylinder and a piston, with a spark plug being disposed at an apex portion of the triangular shape and an intake opening portion and an exhaust opening portion on the top surface of the combustion chamber, wherein:

a projection is provided on a circumferential edge portion of a top surface of the piston, with a surface, facing the top wall surface of the combustion chamber, of said projection being substantially in parallel with the top wall surface of the combustion chamber; and a cutaway portion is formed in the vicinity of at least a portion, facing the intake opening portion, of said projection of the top surface of the piston.

2. The combustion chamber structure according to claim 1, wherein an intake valve is provided to be openable/closeable in the opening portion for air suction, and said cutaway portion serves also as a valve recess for avoiding any contact between the intake valve and the piston when the intake valve is projected into the combustion chamber.

3. The combustion chamber structure according to claim 1, further comprising a swirl flow generating means for generating swirl flows within the combustion chamber, wherein said cutaway portion is constructed by a groove formed in a direction in which the swirl flows generated by said swirl flow generating means are received.

4. The combustion chamber structure according to claim 1, further comprising a swirl flow generating means for generating swirl flows within the combustion chamber, wherein said cutaway portion is constructed by a groove formed in a direction in which the swirl flows generated by said swirl flow generating means are not received.

5. The combustion chamber structure according to claim 1, further comprising a tumble flow generating means for generating tumble flows within the combustion chamber, wherein said cutaway portion is constructed by a groove formed in a direction in which the tumble flows generated by said tumble flow generating means are received.

6. The combustion chamber structure according to claim 1, further comprising a tumble flow generating means for generating tumble flows within the combustion chamber, wherein said cutaway portion is constructed by a groove formed in a direction in which the tumble flows generated by said tumble flow generating means, are not received.

* * * * *